United States Patent
Fujii et al.

(10) Patent No.: US 8,475,687 B2
(45) Date of Patent: Jul. 2, 2013

(54) HYDROGEN STORING CARBON MATERIAL

(75) Inventors: Chihiro Fujii, Chiba (JP); Yasuhiro Oshima, Chiba (JP); Takeaki Kishimoto, Chiba (JP); Rieko Kobayashi, Chiba (JP); Akiko Taira, Chiba (JP); Jun-ichi Ozaki, Kiryu (JP); Haruo Kumagai, Sapporo (JP)

(73) Assignees: National University Corporation Gunma University, Gunma (JP); National University Corporation Hokkaido University, Hokkaido (JP); Nisshinbo Holdings Inc., Tokyo (JP)

( * ) Notice: Subject to any disclaimer, the term of this patent is extended or adjusted under 35 U.S.C. 154(b) by 0 days.

(21) Appl. No.: 13/580,293

(22) PCT Filed: Feb. 21, 2011

(86) PCT No.: PCT/JP2011/053738
§ 371 (c)(1),
(2), (4) Date: Aug. 21, 2012

(87) PCT Pub. No.: WO2011/105336
PCT Pub. Date: Sep. 1, 2011

(65) Prior Publication Data
US 2012/0313053 A1    Dec. 13, 2012

(30) Foreign Application Priority Data
Feb. 26, 2010 (JP) .................. 2010-043196

(51) Int. Cl.
*H01B 1/06* (2006.01)
(52) U.S. Cl.
USPC ........... 252/506; 361/502; 502/416; 502/418; 502/420; 502/432

(58) Field of Classification Search
USPC .................. 252/506; 361/502; 502/416, 418, 502/420, 432
See application file for complete search history.

(56) References Cited

FOREIGN PATENT DOCUMENTS

| JP | A-2003-171111 | 6/2003 |
| JP | A-2005-041742 | 2/2005 |
| JP | A-2006-282444 | 10/2006 |
| JP | A-2007-099612 | 4/2007 |
| JP | A-2009-040646 | 2/2009 |
| JP | A-2010-168251 | 8/2010 |

OTHER PUBLICATIONS

International Search Report issued in Application No. PCT/JP2011/053738; Dated Apr. 5, 2011 (With Translation).
Written Opinion of the International Searching Authority issued in Application No. PCT/JP2011/053738; Dated Apr. 5, 2011 (With Translation).

*Primary Examiner* — Khanh Tuan Nguyen
(74) *Attorney, Agent, or Firm* — Oliff & Berridge, PLC (57) ABSTRACT

Provided is a hydrogen-storing carbon material with improved hydrogen storage capacity. The hydrogen-storing carbon material has a total pore volume of 0.5 cm$^3$/g or more, and a ratio of a total mesoporous volume to a total microporous volume per unit weight of 5 or more. In addition, the hydrogen-storing carbon material may have a nitrogen content of 0.5 wt % or more and less than 20 wt %. In addition, the hydrogen-storing carbon material may have a stable potential of −1.28 V or more when a cathode current with respect to the hydrogen-storing carbon material is held at 1,000 mA/g in electrochemical measurement by chronopotentiometry involving using the hydrogen-storing carbon material in a working electrode in a three-electrode method.

3 Claims, 2 Drawing Sheets

| | HYDROGEN STORAGE QUANTITY (wt%) | SPECIFIC SURFACE AREA (mg/m$^2$) | TOTAL PORE VOLUME (m$^2$/g) | TOTAL MESOPOROUS VOLUME (cm$^3$/g) | TOTAL MICROPOROUS VOLUME (cm$^3$/g) | MESO/MICRO RATIO (—) | NITROGEN CONTENT (wt%) | AVERAGE INTERLAYER DISTANCE (nm) | STABLE POTENTIAL (V vs NHE) |
|---|---|---|---|---|---|---|---|---|---|
| EXAMPLE 1 | 2.6 | 2.0 | 1300 | 2.66 | 1.82 | 0.07 | 26 | 0 | 0.351 | −1.304 |
| EXAMPLE 2 | 3.9 | 4.3 | 910 | 1.84 | 1.22 | 0.06 | 20 | 2.1 | 0.341 | −1.084 |
| EXAMPLE 3 | 3.5 | 4.4 | 800 | 1.82 | 1.22 | 0.02 | 61 | 2.6 | 0.354 | −1.236 |
| COMPARATIVE EXAMPLE 1 | 0.7 | 2.4 | 300 | 0.25 | 0.16 | 0.09 | 1.8 | 2.2 | 0.339 | −1.105 |
| COMPARATIVE EXAMPLE 2 | 0.4 | 1.2 | 340 | 0.46 | 0.30 | 0.08 | 3.8 | 3.8 | 0.342 | −1.084 |
| COMPARATIVE EXAMPLE 3 | 1.9 | 0.6 | 3000 | 1.70 | 0.72 | 1.42 | 0.51 | 0 | 0.341 | −1.335 |

FIG.1

| | HYDROGEN STORAGE QUANTITY | | SPECIFIC SURFACE AREA (m²/g) | TOTAL PORE VOLUME (cm³/g) | TOTAL MESOPOROUS VOLUME (cm³/g) | TOTAL MICROPOROUS VOLUME (cm³/g) | MESO/ MICRO RATIO (—) | NITROGEN CONTENT (wt%) | AVERAGE INTERLAYER DISTANCE (nm) | STABLE POTENTIAL (V vs NHE) |
|---|---|---|---|---|---|---|---|---|---|---|
| | (wt%) | (mg/m²) | | | | | | | | |
| EXAMPLE 1 | 2.6 | 2.0 | 1300 | 2.66 | 1.82 | 0.07 | 26 | 0 | 0.351 | −1.304 |
| EXAMPLE 2 | 3.9 | 4.3 | 910 | 1.84 | 1.22 | 0.06 | 20 | 2.1 | 0.341 | −1.084 |
| EXAMPLE 3 | 3.5 | 4.4 | 800 | 1.82 | 1.22 | 0.02 | 61 | 2.6 | 0.354 | −1.236 |
| COMPARATIVE EXAMPLE 1 | 0.7 | 2.4 | 300 | 0.25 | 0.16 | 0.09 | 1.8 | 2.2 | 0.339 | −1.105 |
| COMPARATIVE EXAMPLE 2 | 0.4 | 1.2 | 340 | 0.46 | 0.30 | 0.08 | 3.8 | 3.8 | 0.342 | −1.084 |
| COMPARATIVE EXAMPLE 3 | 1.9 | 0.6 | 3000 | 1.70 | 0.72 | 1.42 | 0.51 | 0 | 0.341 | −1.335 |

HYDROGEN STORING CARBON MATERIAL

TECHNICAL FIELD

The present invention relates to a hydrogen-storing carbon material, in particular, a carbon material with improved hydrogen storage capacity.

BACKGROUND ART

An investigation has been conducted on use of, for example, an alloy as a hydrogen-storing material expected to be applicable to a hydrogen-storing system in a fuel-cell vehicle or the like. However, when a hydrogen-storing alloy is used, its hydrogen storage capacity is insufficient. In addition, depending on kinds of metal to be used, the alloy not only has low durability but also involves problems in terms of price and reserve.

On the other hand, use of a carbon material that raises no concern about exhaustion of resources and is relatively inexpensive has been investigated. For example, Patent Literature 1 describes a carbon material whose hydrogen storage quantity is increased by expanding an average distance between carbon layers to 0.5 nm or more to cause the carbon layers to hold hydrogen therebetween. In addition, Patent Literature 2 describes an activated carbon material with an increased hydrogen storage quantity as a result of possession of a pore diameter of 0.3 nm or more and 1.5 nm or less.

CITATION LIST

Patent Literature

[Patent Literature 1] JP 2005-41742 A
[Patent Literature 2] JP 2003-171111 A

SUMMARY OF INVENTION

Technical Problem

However, it cannot be said that any carbon material that has been investigated so far has sufficient hydrogen storage capacity to be put into practical use as a hydrogen-storing material.

On the other hand, the inventors of the present invention have paid particular attention to two points concerning structure of a carbon material, i.e., (1) a porous structure suitable for adsorption of a hydrogen molecule and (2) a carbon surface suitable for a dissociative reaction of a hydrogen molecule. The inventors of the present invention have made extensive studies on their own, and as a result, have found that a carbon material having a specific structure shows high hydrogen storage capacity. Thus, the inventors have completed the present invention.

That is, the present invention has been made in view of the problems and an object of the present invention is to provide a hydrogen-storing carbon material with improved hydrogen storage capacity.

Solution to Problem

A hydrogen-storing carbon material according to an embodiment of the present invention to solve the problem above has a total pore volume of 0.5 cm$^3$/g or more, and a ratio of a total mesoporous volume to a total microporous volume per unit weight of 5 or more. According to the present invention, there is provided a hydrogen-storing carbon material with improved hydrogen storage capacity.

In addition, the hydrogen-storing carbon material may have a nitrogen content of 0.5 wt % or more and less than 20 wt %. With this, there is provided a hydrogen-storing carbon material with additionally improved hydrogen storage capacity. In addition, the hydrogen-storing carbon material may have a stable potential of −1.28 V or more when a cathode current with respect to the hydrogen-storing carbon material as a working electrode is held at 1,000 mA/g in electrochemical measurement by chronopotentiometry involving using the hydrogen-storing carbon material in the working electrode in a three-electrode method. With this, there is provided a hydrogen-storing carbon material with more effectively improved hydrogen storage capacity. It should be noted that the term "stable potential" as used in the present invention refers to the minimum potential when a difference between a potential at a certain time point and a potential after 10,000 seconds from the time point becomes less than ±0.002 V for the first time after the initiation of a flow of current that is held at 1,000 mA/g. In addition, a hydrogen-storing carbon material may be obtained by carbonization of a raw material containing an organic substance, a metal, and a carbonized material.

Advantageous Effects of Invention

According to the present invention, the hydrogen-storing carbon material with improved hydrogen storage capacity is provided.

DESCRIPTION OF EMBODIMENTS

Hereinafter, an embodiment of the present invention is described. It should be noted that the present invention is not limited to this embodiment.

First, a standpoint of the inventors of the present invention is described. The mechanism via which a carbon material stores hydrogen is an adsorption of a hydrogen molecule to the surface of the material. Therefore, a carbon material having a porous structure that easily adsorbs hydrogen on a carbon surface and is suitable for holding the adsorbed hydrogen is considered to be suitable as a hydrogen-storing material.

In view of the foregoing, the inventors of the present invention have paid particular attention to two points, i.e., (1) that a carbon material should have a porous structure suitable for the adsorption of a hydrogen molecule and (2) that the dissociative reaction of a hydrogen molecule should efficiently occur on the carbon surface of the carbon material. The inventors have made extensive studies on their own, and as a result, have found a carbon material that exerts hydrogen storage capacity based on the hydrogen storage mechanism above to the fullest extent possible.

Here, the point (1) is described. In the carbon material, a pore (having a diameter of less than 100 nm) present in the carbon material functions as a site for adsorbing a hydrogen molecule. Therefore, the hydrogen storage capacity of the carbon material tends to be higher as the total pore volume of the carbon material increases. However, the hydrogen storage capacity of the carbon material can vary significantly depending not only on the total pore volume but also on the size distribution of its pores.

In view of the foregoing, the inventors of the present invention have made extensive studies on their own paying attention to those points. As a result, the inventors have found that a carbon material having a total pore volume of 0.5 cm$^3$/g or more, and a ratio of a total mesoporous volume to a total microporous volume per unit weight (hereinafter, referred to as "meso/micro ratio") of 5 or more has excellent hydrogen storage capacity.

It should be noted that in the present invention, a micropore is a pore having a diameter of less than 2 nm, and a mesopore is a pore having a diameter of 2 nm or more and 50 nm or less. In addition, the total pore volume is calculated on the basis of, for example, the maximum adsorption in a BET method involving using a nitrogen gas. The total mesoporous volume is calculated by, for example, a BJH method. The total microporous volume is calculated by, for example, an MP method.

It has been conventionally acknowledged that a carbon material is more advantageous for hydrogen storage as the material contains a larger number of micropores (for example, has a smaller meso/micro ratio). However, an investigation conducted by the inventors of the present invention on their own has unexpectedly revealed that a carbon material having a large meso/micro ratio shows high hydrogen storage capacity.

Although the reason for the foregoing is unclear, in consideration of, for example, such an action mechanism that hydrogen enters a pore of the carbon material and then the hydrogen adsorbs to the surface of the pore, the carbon material having a large meso/micro ratio is assumed to show high hydrogen storage capacity because a mesopore reaches the adsorption equilibrium of hydrogen faster than a micropore does.

The total pore volume of the hydrogen-storing carbon material is preferably 1.0 cm$^3$/g or more, more preferably 1.5 cm$^3$/g or more. When the total pore volume of the carbon material is less than 0.5 cm$^3$/g, the carbon material cannot have sufficient hydrogen storage capacity.

The meso/micro ratio is preferably 10 or more, more preferably 15 or more. When the meso/micro ratio of the carbon material is less than 5, the carbon material cannot have sufficient hydrogen storage capacity.

Next, the point (2) is described. With regard to the adsorption of hydrogen in a vapor phase to carbon, such dissociation equilibrium of hydrogen as represented by the following formula (I) is established when a temperature is extremely high (for example, 1,000° C. or more).

[Chem. 1]

$$H_2 \Leftrightarrow 2H \tag{I}$$

It has been reported that in this case, for example, such adsorption of hydrogen as represented by each of the following formula (IIa) and formula (IIb) occurs even in a carbon material like graphite, that is chemically stable and does not show any chemical reaction with hydrogen in a temperature zone lower than normal temperature (Yu S Nechaev, O K Alexeeva: On the nature, capacity and reversibility of hydrogen storage in novel carbon nanomaterials for mobile power units. International Journal of Hydrogen Energy 28 2003; 1433-1443, Atsumi. H, Tokura S, Miyake M: Adsorption and desorption of deuterium on graphite at elevated temperatures. J Nucl Mater 1988; 155-157:241-5)

[Chem. 2]

$$2H+C \rightarrow H_2C \tag{IIa}$$

[Chem. 3]

$$H+C \rightarrow HC \tag{IIb}$$

At high temperatures, the equilibrium state represented by the formula (I) is easily achieved, and the adsorption of dissociated hydrogen to carbon represented by each of the formula (IIa) and formula (IIb) serves as a reaction rate-determining step. However, in a temperature region where hydrogen storage is practically performed (for example, around room temperature), almost no spontaneous dissociative reaction of hydrogen occurs and dissociative adsorption equilibrium is achieved by the presence of a site having reaction activity for a dissociative reaction.

The reactions represented by the formula (I), formula (IIa), and formula (In) are represented by the following formula (III) because a reaction active site for hydrogen in the carbon material according to the present invention is considered to be derived from carbon. Equilibrium represented by the formula (III) is dominated by the reactivity of the carbon material.

[Chem. 4]

$$1/2H_2+C \Leftrightarrow C\text{—}H \tag{III}$$

Meanwhile, an electrochemical reaction similar to the formula (III) including the adsorption of hydrogen is given by the following formula (IV). This reaction is considered to reach equilibrium in a region showing a stable potential to be observed after a transition region in electrochemical measurement by chronopotentiometry.

[Chem. 5]

$$C+H_2O+e^- \Leftrightarrow C\text{—}H+OH^- \tag{IV}$$

At this time, an equilibrium constant K of the formula (IV) is represented by the following formula (V) with activities.

[Math. 1]

$$K = \frac{a_{C-H} a_{OH^-}}{a_C a_{e^-} a_{H_2O}} \tag{V}$$

Further, the equilibrium constant K is represented by the following formula (VI) with a standard reaction Gibbs energy $\Delta_r G^0$. Here, in the following formula (VI), R represents a gas constant and T represents a temperature (K).

[Math. 2]

$$\ln K = \frac{-\Delta_r G^o}{RT} \tag{VI}$$

Further, the standard reaction Gibbs energy is represented by the following formula (VII) with an electrode potential E. Here, in the following formula (VII) v represents the number of electrons involved in the reaction represented by the formula (IV) (v=1) and F represents Faraday's constant.

[Math. 3]

$$E = \frac{-\Delta_r G^\circ}{vF} \quad \text{(VII)}$$

As described above, the electrode potential of the reaction represented by the formula (IV) in the electrochemical measurement serves as an indicator indicating the equilibrium constant K. Of the activities represented in the formula (V) $a_{e^-}$, $a_{H2O}$, and $a_{OH^-}$ can each be set to "1" because "e⁻," "H₂O," and "OH⁻" exist in large excess in the reaction conditions. Accordingly, a factor dominating the equilibrium constant K is represented with a ratio β of activities concerning carbon as represented by the following formula (VIII).

[Math. 4]

$$\beta = \frac{a_{C-H}}{a_c} \quad \text{(VIII)}$$

Even in the reaction represented by the formula (III) in the vapor phase, the factor dominating the equilibrium constant K is the ratio β of the activities concerning carbon, and is common to the electrochemical reaction represented by the formula (IV). Thus, reactivity between carbon and hydrogen in the vapor phase is evaluated by the electrochemical measurement.

In view of the foregoing, the inventors of the present invention have made extensive studies on their own, and as a result, have found that a hydrogen-storing carbon material, which has a total pore volume of 0.5 cm³/g or more and a meso/micro ratio of 5 or more, and which has a stable potential of −1.28 V or more when a cathode current with respect to the hydrogen-storing carbon material as a working electrode is held at 1,000 mA/g in electrochemical measurement by chronopotentiometry involving using the hydrogen-storing carbon material in the working electrode in a three-electrode method, has additionally excellent hydrogen storage capacity.

The stable potential is a stable potential to be observed after a transition region where a potential abruptly changes in the case where the potential is measured over time in the electrochemical measurement by chronopotentiometry while a constant cathode current is caused to flow through the working electrode. The stable potential refers to the minimum potential when a difference between a potential at a certain time point and a potential after 10,000 seconds from the time point becomes less than ±0.002 V for the first time after the initiation of the flow of the current that is held at 1,000 mA/g.

Although the reason why the hydrogen storage capacity of the carbon material having a specific porous structure is significantly improved when the material further has a specific electrochemical characteristic as described above is unclear, a possible reason is, for example, that a porous structure having a large meso/micro ratio not only increases the adsorption rate of hydrogen but also improves the ease with which the dissociative reaction of hydrogen occurs on the carbon surface.

That is, a mesopore is considered to be advantageous as a field for providing an active site of the dissociative reaction. That is, a micropore is present mainly in an amorphous component of the carbon material, and its thermal stability is so low that there is a high possibility that its structure will change during a process for providing a catalytic active site.

In contrast, the mesopore that easily provides a structure having high thermal stability easily forms a catalytic active site.

Therefore, the hydrogen-storing carbon material according to the present invention brings together the function according to the point (1) and the function according to the point (2), and as a result, a hydrogen molecule efficiently adsorbs in its porous structure and the hydrogen molecule dissociates on its carbon surface. Accordingly, its hydrogen storage capacity is dramatically improved.

In addition, the nitrogen content of the hydrogen-storing carbon material according to the present invention is preferably 0.5 wt % or more and less than 20 wt %, more preferably 0.7 wt % or more and 10 wt % or less.

When the nitrogen content falls short of the range, the amount of nitrogen present on the carbon surface is insufficient and hence the dissociation of hydrogen on the carbon surface does not progress efficiently in some cases. In addition, when the nitrogen content is excessively large, it becomes difficult to control the porous structure at the time of the production of the carbon material and hence such a porous structure suitable for hydrogen adsorption as described above cannot be formed in some cases.

In addition, the specific surface area of the hydrogen-storing carbon material according to the present invention is, for example, preferably 400 m²/g or more, more preferably 600 m²/g or more. In addition, the mesoporous volume of the hydrogen-storing carbon material is, for example, preferably 0.5 cm³/g or more, more preferably 1.0 cm³/g or more. In addition, an average interlayer distance in the carbon structure of the hydrogen-storing carbon material is, for example, preferably 0.4 nm or less. More specifically, the distance is preferably 0.335 nm or more and 0.4 nm or less.

The hydrogen-storing carbon material according to the present invention may be a carbon material manufactured by, for example, a sol-gel method, a template method, a furnace method, a channel method, an acetylene method, a lampblack method, a turpentine soot method, a chemical vapor deposition method (CVD method), or activation.

Specifically, for example, one or two or more kinds selected from the group consisting of a carbon nanotube, a carbon nanofiber, carbon black (e.g., carbon black such as ketjen black or acetylene black), graphite, activated carbon, glassy carbon, mesoporous carbon, a carbon fiber, fullerene, and onion-like carbon may be used. Of those, carbon materials each having a large mesoporous volume such as a carbon nanotube, a carbon nanofiber, and carbon black (e.g., carbon black such as ketjen black or acetylene black) may be particularly preferably used.

In addition, the hydrogen-storing carbon material according to the present invention may be formed of, for example, a carbon material having catalytic action by which a hydrogen atom is produced from a hydrogen molecule. In this case, the hydrogen-storing carbon material may be, for example, a carbon material obtained by the carbonization of a raw material containing an organic substance, a metal, and a carbonized material. It should be noted that the catalytic action by which a hydrogen atom is produced from a hydrogen molecule is evaluated through electrochemical measurement by chronopotentiometry as described above. That is, the fact that the hydrogen-storing carbon material according to the present invention maintains a higher potential than that of a carbon material such as carbon black in chronopotentiometry means that its overvoltage reduces in the electrolysis of water, and hence it is said that the hydrogen-storing carbon material has catalytic activity. Here, the potential of the hydrogen-storing carbon material according to the present invention in chronopotentiometry is, for example, preferably −1.28 V or more, more preferably −1.24 V or more. The carbon material showing such potential shows such catalytic activity as described above and has high hydrogen storage capacity.

The organic substance in the raw material is not particularly limited as long as the substance is carbonized (the substance is used as a carbon source), and one kind of arbitrary substance, or two or more kinds thereof may be used. That is, for example, one, or both, of a high-molecular weight organic compound (e.g., a resin such as a thermoplastic resin or a thermosetting resin) and a low-molecular weight organic compound may be used as the organic substance. A biomass such as plant waste may also be used.

An organic substance containing nitrogen may be preferably used as the organic substance. The nitrogen-containing organic substance is not particularly limited as long as the substance contains an organic compound containing a nitrogen atom in a molecule thereof and can be carbonized, and one kind of arbitrary substance, or two or more kinds thereof, may be used.

Specifically, for example, one or two or more kinds selected from the group consisting of pyrrole, polypyrrole polyvinylpyrrole, 3-methylpolypyrrole, vinylpyridine, polyvinylpyridine, imidazole, 2-methylimidazole, aniline, polyaniline, polyaminobismaleimide, polyimide, benzimidazole, polybenzimidazole, polyamide, acrylonitrile, polyacrylonitrile, chitin, chitosan, silk, wool, a polyamino acid, a nucleic acid, DNA, RNA, hydrazine, hydrazide, urea, salen, polycarbazole, polybismaleimide, triazine, melamine, a melamine resin, and a polyamideimide resin may be used as the nitrogen-containing organic compound.

In addition, for example, one or two or more kinds selected from the group consisting of food industrial waste such as sake cake, malted rice, coffee grounds, used tea leaves, brewer's spent grains, and rice bran, wooden waste such as forest land remainder material and building waste, and domestic waste such as sewage sludge may be used as the biomass such as waste. The nitrogen-containing organic compound may further contain one or two or more kinds selected from the group consisting of boron, phosphorus, oxygen, and sulfur.

In addition, the organic substance may further contain a resin component. The resin component is not particularly limited as long as the resin component is a polymer material that can be carbonized, and one kind of arbitrary resin component, or two or more kinds thereof, may be used. That is, for example, a thermosetting resin or thermoplastic resin that can be carbonized may be used.

Specifically, for example, one kind or two or more kinds selected from the group consisting of a chelate resin, cellulose, carboxymethyl cellulose, polyvinyl alcohol, polyacrylic acid, polymethylacrylate, polymethylmethacrylate, polyfurfuryl alcohol, a furan resin, a phenol resin, a phenol-formaldehyde resin, an epoxy resin, pitch, brown coal, polyvinylidene chloride, lignin, anthracite, a biomass, a protein, humic acid, polysulfone, and an ionomer may be used.

Although the content of the organic substance in the raw material is not particularly limited as long as the content falls within such a range that the carbon material having the specific carbon structure is obtained, for example, the content may be set to fall within the range of 1 to 70 wt %, and is preferably set to fall within the range of 3 to 50 wt %. When the content of the organic substance falls short of the range, the number of active sites for dissociating hydrogen on the carbon surface is small, and hence a sufficient hydrogen storage quantity cannot be obtained in some cases. In addition, when the content of the organic substance exceeds the range, it becomes difficult to control the porous structure at the time of the production of the carbon material and hence such a porous structure suitable for hydrogen adsorption as described above cannot be formed in some cases.

The metal in the raw material is not particularly limited as long as the metal does not inhibit the hydrogen storage capacity of the carbon material to be produced. That is, for example, a transition metal may be preferably used as the metal, and metals belonging to the fourth period of Groups 3 to 12 in the periodic table may each be particularly preferably used. One kind of metal may be used alone, or two or more kinds thereof may be used in combination.

Specifically, for example, one or two or more kinds selected from the group consisting of cobalt, iron, nickel, manganese, zinc, copper and chromium may be preferably used, and cobalt, iron, manganese, and nickel may be particularly preferably used.

A simple substance of the metal or a compound of the metal may be used as the metal. As the metal compound, for example, a metal salt, a metal hydroxide, a metal oxide, a metal nitride, a metal sulfide, a metal carbide, and a metal complex can be preferably used, and a metal salt, a metal oxide, and a metal complex may be particularly preferably used.

Although the content of the metal in the raw material is not particularly limited as long as the content falls within such a range that the metal does not inhibit the hydrogen storage capacity of the carbon material to be produced, the content is set to preferably fall within, for example, the range of 0.5 to 75 wt %, more preferably the range of 2 to 40 wt %.

When the metal content falls short of the range, the inside of the system at the time of the production of the carbon material becomes nonuniform, the carbonization progresses only in the vicinity of the place at which the metal is present, and a uniform carbon material cannot be obtained in some cases. In addition, when the metal content exceeds the range, the extent to which graphitization progresses enlarges and hence the porous structure of the carbon material to be obtained is unsuitable for hydrogen adsorption in some cases.

The carbonized material in the raw material is not particularly limited as long as the material is a material that has been carbonized, and contributes to the formation of the specific porous structure in the carbonization of the raw material, and one kind of arbitrary carbonized material, or two or more kinds thereof, may be used.

Specifically, for example, one or two or more kinds selected from the group consisting of a carbon nanotube, a carbon nanofiber, carbon black (e.g., carbon black such as ketjen black or acetylene black), graphite, activated carbon, glassy carbon, mesoporous carbon, a carbon fiber, fullerene, and onion-like carbon may be used. Of those, carbon materials each having a large mesoporous volume such as a carbon nanotube, a carbon nanofiber, and carbon black (e.g., carbon black such as ketjen black or acetylene black) may be particularly preferably used.

The specific surface area of the carbonized material is, for example, preferably 400 $m^2/g$ or more, more preferably 600 $m^2/g$ or more. The content of the carbonized material in the raw material is not particularly limited as long as the content falls within such a range that the material contributes to the formation of the specific porous structure in the carbonization of the raw material. FOr example, the content may be set to fall within the range of 1 to 95 wt a, and is preferably set to fall within the range of 30 to 90 wt %.

When the content of the carbonized material falls short of the range, a carbon material having a porous structure suitable for hydrogen storage is not obtained in some cases. In addition, when the content of the carbonized material exceeds the range, the amount of nitrogen on, for example, the carbon surface reduces and hence the adsorption of hydrogen on the carbon surface does not progress efficiently in some cases.

Therefore, the raw material preferably contains, for example, 1 to 70 wt % of the organic substance and 30 to 90 wt % of the carbonized material. In addition, more specifically, the raw material preferably contains, for example, 3 to 50 wt % of the organic substance, 2 to 40 wt % of the metal, and 30 to 90 wt % of the carbonized material.

In addition, the raw material may contain any other component. That is, any other material such as a ceramic material or a metal material may be added to the raw material for the purpose of, for example, increasing the surface area of the hydrogen-storing carbon material according to the present invention. Specifically, for example, one or two or more kinds selected from the group consisting of mesoporous silica, mesoporous carbon, metal powder, a metal fine particle, and a metal fiber may be used. For example, the content of such other material in the raw material may be set to fall within the range of 1 to 90 wt %, and is preferably set to fall within the range of 20 to 70 wt %.

The carbonization is performed by heating the raw material and holding the raw material at such a predetermined temperature that the raw material is carbonized (hereinafter, referred to as "carbonization temperature") for a predetermined time period. The carbonization temperature is not particularly limited as long as the raw material is carbonized at the temperature.

That is, for example, the carbonization temperature may be set to 300° C. or more, and may be preferably set to 700° C. or more. More specifically, for example, the carbonization temperature may be set to fall within the range of 300 to 3,000° C., may be preferably set to fall within the range of 700 to 2,000° C., and may be more preferably set to fall within the range of 700 to 1,500° C.

When the carbonization temperature falls short of the range, the carbonization is insufficient, and hence no porous structure is formed and a carbon material having a porous structure suitable for hydrogen storage cannot be produced in some cases. In addition, when the carbonization temperature exceeds the range, the graphitization progresses to so large an extent that a sufficient amount of nitrogen does not remain on the carbon surface and a porous structure having a sufficient volume cannot be formed in some cases.

A rate of temperature increase up to the carbonization temperature may be set to fall within the range of, for example, 0.5 to 300° C./min. For example, the time period for which the raw material is held at the carbonization temperature may be set to fall within the range of 5 minutes to 24 hours, and may be preferably set to fall within the range of 20 minutes to 2 hours. The carbonization is preferably performed in a stream of an inert gas such as nitrogen.

In addition, the hydrogen-storing carbon material obtained by the carbonization may be pulverized into fine particles. A method for the pulverization is not particularly limited as long as the surface area of the carbon material is increased, and any known method may be employed. That is, the fine particles of the carbon material may be prepared with pulverizing means such as a ball mill, a bead mill, or a jet mill.

The hydrogen-storing carbon material obtained by the carbonization may be subjected to a washing treatment for reducing its metal content or removing its metal. An acid such as hydrochloric acid or sulfuric acid may be preferably used in the washing treatment.

The hydrogen-storing carbon material obtained by the carbonization may be activated. A method of activating the carbon material is not particularly limited, and for example, ammoxidation, carbon dioxide activation, phosphoric acid activation, alkali activation, or steam activation may be employed.

The hydrogen-storing carbon material obtained by the carbonization may be subjected to a heat treatment. The heat treatment is performed by further holding the hydrogen-storing carbon material obtained by the carbonization at a predetermined temperature. The temperature for the heat treatment may be set to fall within the range of, for example, 300 to 1,500° C.

A metal may be added to the hydrogen-storing carbon material obtained by the carbonization by a method such as a metal impregnation method or a mechanical alloying method. The metal to be added is not particular limited as long as the metal does not inhibit the hydrogen storage capacity of the carbon material, and for example, metals such as titanium, manganese, nickel, zirconium, cobalt, aluminum, iron, niobium, vanadium, magnesium, palladium, calcium, zinc, and platinum may be preferably used.

The hydrogen-storing carbon material according to the present invention exhibits high hydrogen storage capacity. That is, the hydrogen storage quantity of the hydrogen-storing carbon material is, for example, 2.0 wt % or more, preferably 2.5 wt % or more, more preferably 3.0 wt % or more. In addition, the hydrogen storage quantity per unit area of the hydrogen-storing carbon material is, for example, 1.5 mg/m$^2$ or more, preferably 2.5 mg/m$^2$ or more, more preferably 3.0 mg/m$^2$ or more.

The hydrogen-storing carbon material according to the present invention may be used not only as a hydrogen-storing material that merely performs the storage and emission of hydrogen but also as an electrode material for, for example, a nickel-hydrogen cell or an air cell because the material shows high hydrogen storage capacity.

Next, a specific example according to this embodiment is described.

EXAMPLES

Example 1

Ketjen black (EC600JD, Lion Corporation) as high-specific surface area carbon black was prepared as a hydrogen-storing carbon material.

Example 2

1.5 Grams of a polyacrylonitrile-polymethacrylic acid copolymer were dissolved in 30 g of dimethylformamide. After that, 1.5 g of cobalt chloride hexahydrate and 1.5 g of 2-methylimidazole were added to the solution, and then the mixture was stirred for 2 hours. Thus, a blue solution was obtained. The ketjen black (EC600JD manufactured by Lion Corporation) was added to the resultant solution so that its content in a precursor composition to be described later was 67 wt %, and then the contents were mixed with a mortar. After that, dimethylformamide was removed by drying the mixture under reduced pressure at 60° C. and 6.4×10$^{-2}$ Pa for 12 hours. Thus, a precursor composition was obtained.

Next, the precursor composition was subjected to an infusible treatment. That is, the precursor composition was set in a forced circulation dryer. Then, in the air, the temperature in the dryer was increased from room temperature to 150° C. over 30 minutes and then increased from 150° C. to 220° C. over 2 hours. After that, the precursor composition was held at 220° C. for 3 hours. Thus, the precursor composition was made infusible.

Then, the precursor composition was carbonized. That is, the precursor composition obtained as described above was loaded into a quartz tube and then the quartz tube was subjected to a nitrogen purge for 20 minutes in an ellipsoidal reflection-type infrared gold image furnace. Next, heating was started to increase the temperature in the gold image furnace from room temperature to 900° C. at a rate of temperature increase of 50° C./min. After that, the quartz tube was held at 900° C. for 1 hour. Thus, a hydrogen-storing carbon material produced by the carbonization of the precursor composition was obtained.

Further, the hydrogen-storing carbon material was subjected to a pulverization treatment. That is, a silicon nitride ball having a diameter of 10 mm was set in a planetary ball mill (P-7 manufactured by FRITSCH JAPAN CO., LTD.) and then the hydrogen-storing carbon material obtained by the carbonization was pulverized at a rotational speed of 650 rpm for 50 minutes. The pulverized hydrogen-storing carbon material was taken out and classified with a sieve having an aperture of 106 μm. The hydrogen-storing carbon material that had passed through the sieve was obtained as a pulverized, fine particulate hydrogen-storing carbon material.

Example 3

A fine particulate hydrogen-storing carbon material was obtained by the same method as that of Example 2 described above except that manganese(II) chloride tetrahydrate was used instead of cobalt chloride hexahydrate.

Comparative Example 1

A fine particulate hydrogen-storing carbon material was obtained by the same method as that of Example 2 described above except that the ketjen black (EC600JD manufactured by Lion Corporation) was not added to the precursor composition.

Comparative Example 2

A fine particulate hydrogen-storing carbon material was obtained by the same method as that of Example 2 described above except that the content of the ketjen black (EC600JD manufactured by Lion Corporation) in the precursor composition was set to 23 wt %.

Comparative Example 3

Porous carbon (Maxsorb (trademark) manufactured by Kansai Coke and Chemicals Co., Ltd.) as activated carbon subjected to alkali activation was prepared as a hydrogen-storing carbon material.

(Measurement of Specific Surface Area, Total Pore Volume, Mesoporous Volume, and Microporous Volume)

The specific surface areas, total pore volumes, mesoporous volumes, and microporous volumes of the carbon materials prepared in Examples 1 to 3 and Comparative Examples 1 to 3 described above were measured with a specific surface area/pore distribution-measuring apparatus (Tristar 3000 manufactured by Shimadzu Corporation).

First, 0.1 g of a carbon material was held at 100° C. and $6.7 \times 10^{-2}$ Pa for 3 hours. Thus, moisture adsorbing to the carbon material was removed. Next, the specific surface area of the carbon material was measured by a BET method involving using a nitrogen gas. In addition, its total pore volume was calculated from the maximum adsorption of the nitrogen gas. Further, its microporous volume was calculated by an MP method and its mesoporous volume was calculated by a BJH method. In addition, its meso/micro ratio was calculated by dividing the mesoporous volume by the microporous volume.

It should be noted that the MP method is a method of determining the volume, area, and distribution of micropores using a "t-plot method" (B C Lippene, J H de Boer, J Catalysis, 4, 319 (1965)), devised by Mikhail, Brunuer, and Bodor (R S Mikhail, S Brunauer, E E Bodor, J Colloid Interface Sci, 26, 45, (1968)). In addition, the BJH method is a representative method of determining the distribution of mesopores, proposed by Barrett, Joyner, and Halenda (E P Barrett, L G Joyner and P P Halenda, J Am Chem Soc, 73, 373, (1951)).

(Measurement of Hydrogen Storage Quantity)

The hydrogen storage quantity of each carbon material was measured in accordance with JIS H 7201. First, about 1 g of the carbon material was inserted into a sample tube and then the tube was evacuated to a vacuum for 18 hours or more. After that, an He gas was introduced into the sample tube and then the volume of the carbon material was measured. Further, the He gas was removed from the sample tube by evacuating the tube to a vacuum for 3 hours or more.

Then, a hydrogen gas was introduced into the sample tube until its pressure reached 40 MPa, and then the hydrogen storage quantity (wt %) was measured. It should be noted that the measurement was performed at a temperature of −30° C. (243 K). In addition, a hydrogen storage quantity per unit surface area (mg/m$^2$) was calculated by dividing the hydrogen storage quantity thus obtained by the specific surface area obtained as described above.

(Measurement of Nitrogen Content)

The nitrogen content of each carbon material was measured with an organic trace element analyzer (240011 manufactured by PerkinElmer Inc.) by a combustion method. 2 Milligrams of the carbon material were analyzed with helium as a carrier gas under the conditions of a combustion tube temperature of 980° C. and a reduction tube temperature of 640° C. It should be noted that a time period for which oxygen was supplied to the combustion tube of 1 second and a combustion time of 20 seconds were added to the standard conditions of the analyzer for optimizing the combustion conditions.

(Measurement of Average Interlayer Distance)

First, the X-ray diffraction measurement of a carbon material was performed. That is, the sample of the carbon material was loaded into a recess of a glass sample plate and held with a slide glass. Thus, the sample was uniformly filled into the recess so that its surface and a reference surface coincided with each other. Next, the glass sample plate was fixed to a wide-angle X-ray diffraction sample base so that the shape of the filled sample did not collapse.

Then, the powder X-ray diffraction measurement of each sample was performed with an X-ray diffractometer (Rigaku RINT2100/PC manufactured by Rigaku Corporation) to measure its diffraction peak, and then integration was performed four times. Thus, X-ray diffraction data to be analyzed was obtained. It should be noted that a voltage and current applied to an X-ray tube were set to 50 kV and 300 mA, respectively. In addition, a sampling interval was set to 0.1° or 0.01°, a scanning rate was set to 1°/min, and a measurement angle range (2θ) was set to 5 to 90°. A CuKα ray was used as an incident X-ray.

Next, an evaluation for the laminated structure of carbon network surfaces in a carbon structure was performed on the basis of the resultant x-ray diffraction data. That is, an average $L_C$, the lamination number of the carbon network surfaces and the distribution of the number, and an average spacing $d_{002}$ were analyzed with analytical software installed in a computer (Carbon Analyzer D series, Hiroyuki Fujimoto, http:/www.asahi-net.or.jp/~qn6h-fjmt/).

In a calculation process with the software, the following five steps were performed: (1) the intensity correction of a diffraction line; (2) the correction of a background; (3) the calculation of a Patterson function; (4) an evaluation for validity by inverse Fourier calculation; and (5) the calculation of the average $L_C$, an average lamination number, a lamination number distribution, and the average spacing $d_{002}$ with the Patterson function.

That is, first, the diffraction data from 5° to 40° obtained by the X-ray diffraction measurement was subjected to the diffraction line intensity correction and the background correction. In the diffraction line intensity correction, a linear absorption coefficient μ of carbon was set to 4.219, a sample thickness t was set to 0.2 mm, a divergence slit width β was set to 2/3°, and a goniometer radius R was set to 285 mm. The background correction was performed by a spline interpolation method with a point around 15° and a point around 35° as base points.

Next, the Patterson function was calculated with the data after the corrections. An integration starting angle and an integration ending angle were set to 5° and 40°, respectively, and then the inverse Fourier calculation was performed by Hirsch's method while a calculation distance u was changed. Thus, the evaluation for validity was performed. It should be noted that the Hirsch's method is a known method proposed by Hirsch in 1954 for evaluating the average lamination number and lamination number distribution of carbon network surfaces in a sample having a relatively small network surface size, such as coal or pitch.

The remaining calculation process was performed with the Patterson function thus calculated in accordance with the standard procedure of the software. Thus, the average interlayer distance of the carbon material was calculated.

(Electrochemical Measurement by Chronopotentiometry)

First, a working electrode carrying any one of the carbon materials was produced. That is, 30 mg of the carbon material, acetylene black as a conductive aid, and a PTFE as a binder were weighed at a weight ratio of 8:1:1, and were then mixed with an agate mortar. After that, the mixture was pressed at 22 MPa for 20 minutes. Thus, pellet having a diameter of 13 mm were produced. The resultant pellets were sandwiched between nickel meshes, followed by crimping at 7 MPa for 10 minutes. Thus, the working electrode was obtained.

In addition, an $Hg/HgSO_4$ electrode was used as a reference electrode, and glassy carbon was used as a counter electrode. The working electrode, the reference electrode, and the counter electrode were immersed in a beaker containing 50 mL of a 6-M aqueous solution of KOH. Thus, a three-electrode electrochemical cell was produced.

Next, a cyclic voltammetry test was performed with an electrochemical analyzer 760 (manufactured by BAS Inc.) under the conditions of a potential width of −0.885 to 0.215 V (vs NHE), a sweep rate of 50 mV/s, and 10 cycles. Thus, a surface washing treatment for washing out a component eluted in the aqueous solution of KOH from the surface of the material was performed.

After that, chronopotentiometry was performed, which involved measuring its potential over time while causing a cathode current at a constant current density of 1,000 mA/g through the carbon material. Then, the minimum potential when a difference between a potential at a certain time point and a potential after 10,000 seconds from the time point became less than ±0.002 V for the first time after the initiation of the flow of the current that was held at 1,000 mA/g was read as a stable potential. It should be noted that the electrochemical measurement was performed at room temperature (25° C.).

(Results)

Figure 1:
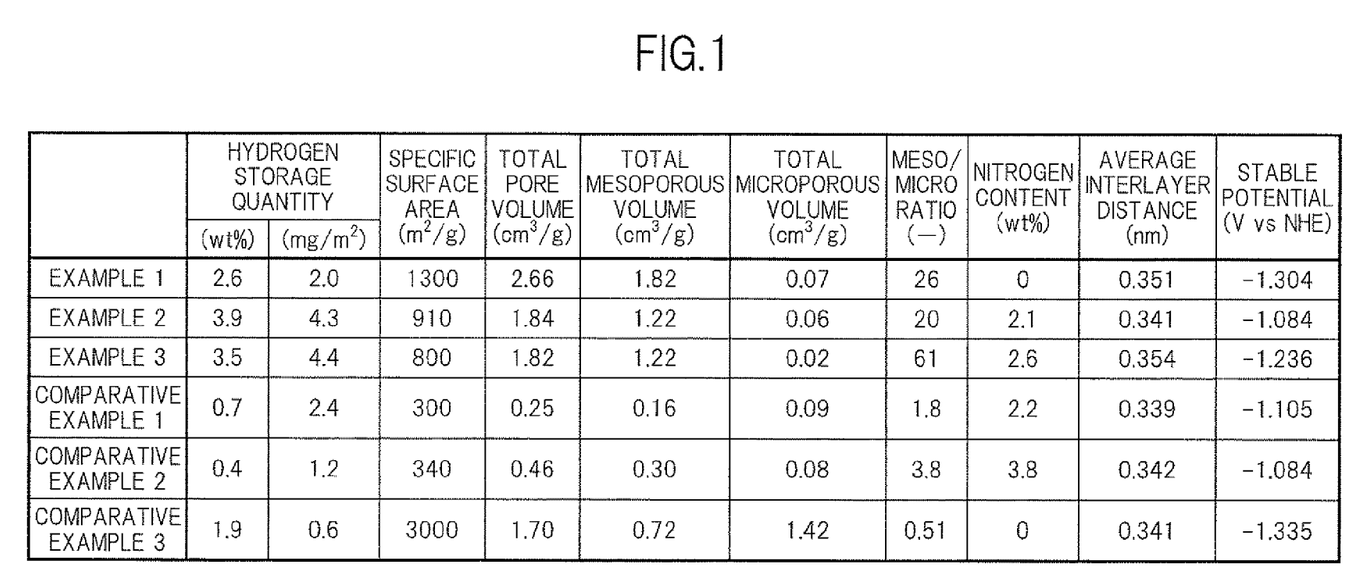
FIG. 1 An explanatory diagram showing examples of the results of evaluations of characteristics of a carbon material in each example according to an embodiment of the present invention.

FIG. 1 shows results obtained by evaluating a carbon material for its characteristics as described above. That is, FIG. 1 shows a hydrogen storage quantity (wt %) represented in a weight percentage unit, a hydrogen storage quantity per unit area ($mg/m^2$), a specific surface area ($m^2/g$), a total pore volume ($cm^3/g$), a total mesoporous volume ($cm^3/g$), a total microporous volume ($cm^3/g$), a meso/micro ratio (−), a nitrogen content (wt %), an average interlayer distance (nm), and a stable potential (V vs NHE) for each of the carbon materials according to Examples 1 to 3 and Comparative Examples 1 to 3.

Figure 2:
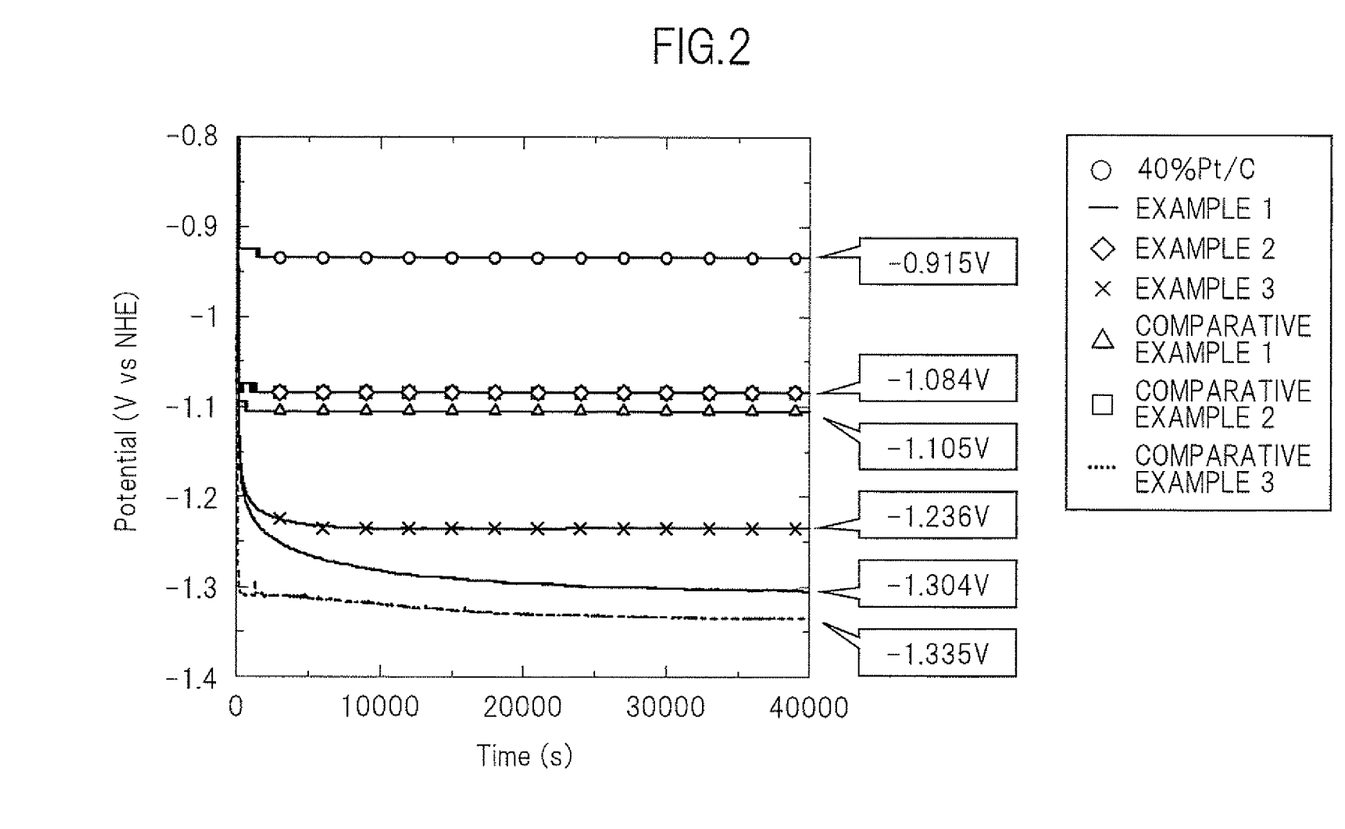
FIG. 2 An explanatory diagram showing examples of the results of electrochemical measurement performed by chronopotentiometry in the examples according to the embodiment of the present invention.

FIG. 2 shows a chronopotentiogram obtained by the potential measurement in chronopotentiometry. In FIG. 2, the axis of abscissa indicates an elapsed time (s) from the initiation of the flow of the cathode current and the axis of ordinate indicates a measured potential (V vs NHE). It should be noted that the term "40% Pt/C" shown in FIG. 2 refers to the results of the measurement in the case where a material having extremely high catalytic activity in the electrolysis of water, which was produced by causing ketjen black (EC600JD manufactured by Lion Corporation) to carry 40 wt % of platinum, was used in a working electrode for comparison.

As shown in FIG. 1, the carbon materials according to Examples 1 to 3 showed significantly large hydrogen storage quantities compared with those of the carbon materials according to Comparative Examples 1 to 3. The meso/micro ratios of the carbon materials according to Examples 1 to 3 each showing high hydrogen storage capacity as described above were significantly high compared with those of the carbon materials according to Comparative Examples 1 to 3. Therefore, each of the carbon materials according to Examples 1 to 3 was considered to exert high hydrogen storage capacity because the carbon material had a porous structure having a relatively large total pore volume and a large meso/micro ratio.

In addition, the hydrogen storage quantities of the carbon materials according to Example 2 and Example 3 were significantly high compared even with that of the carbon material according to Example 1. In this regard, as shown in FIG. 1 and FIG. 2, a stable potential in chronopotentiometry involving using each of the carbon materials according to Example 2 and Example 3 was −1.28 V or more (that is, the stable potential of Example 2 was −1.084 V (1,000 to 11,000 s) and the stable potential of Example 3 was −1.236 V (6,000 to 16,000 s)), but a stable potential in the case where the carbon material according to Example 1 was used was −1.304 V (25,000 to 35,000 s). It should be noted that the stable potential of Comparative Example 1 was −1.105 V (700 to 10,700 s), the stable potential of Comparative Example 2 was −1.084 V (1,300 to 11,300 s), the stable potential of Comparative Example 3 was −1.335 V (30,000 to 40,000 s), and the stable potential of the 40% Pt/C was −0.915 V (200 to 10,200 s).

Therefore, each of the carbon materials according to Example 2 and Example 3 was considered to exert particularly high hydrogen storage capacity because the carbon material not only had a porous structure having a large meso/micro ratio but also had a characteristic for realizing an efficient dissociative reaction of hydrogen, i.e., a stable potential in chronopotentiometry of −1.28 V or more.

The following fact was also considered to contribute to the high hydrogen storage capacity. While the carbon material according to Example 1 was free of nitrogen, the carbon materials according to Example 2 and Example 3 each had a nitrogen content of a predetermined value or more.

The invention claimed is:

1. A hydrogen-storing carbon material, which has a total pore volume of 0.5 cm$^3$/g or more, and a ratio of a total mesoporous volume to a total microporous volume per unit weight of 5 or more, wherein the hydrogen-storing carbon material has a nitrogen content of 0.5 wt % or more and less than 20 wt %.

2. The hydrogen-storing carbon material according to claim 1, wherein the hydrogen-storing carbon material is obtained by carbonization of a raw material containing an organic substance, a metal, and a carbonized material.

3. The hydrogen-storing carbon material according to claim 2, wherein the hydrogen-storing carbon material has a stable potential of −1.28 V or more when a cathode current with respect to the hydrogen-storing carbon material is held at 1,000 mA/g in electrochemical measurement by chronopotentiometry involving using the hydrogen-storing carbon material in a working electrode in a three-electrode method.

* * * * *